(12) United States Patent
Mudulodu et al.

(10) Patent No.: US 7,333,456 B2
(45) Date of Patent: Feb. 19, 2008

(54) TRAINING INFORMATION TRANSMISSION METHOD IN A BLOCK TRANSMISSION SYSTEM

(75) Inventors: Sriram Mudulodu, Milpitas, CA (US); Krishnamurthy Giridhar, Chennai (IN)

(73) Assignee: Beceem Communications Inc., Santa Clara, CA (US)

( * ) Notice: Subject to any disclaimer, the term of this patent is extended or adjusted under 35 U.S.C. 154(b) by 399 days.

(21) Appl. No.: 11/192,343

(22) Filed: Jul. 28, 2005

(65) Prior Publication Data

US 2006/0034227 A1 Feb. 16, 2006

Related U.S. Application Data

(60) Provisional application No. 60/598,311, filed on Aug. 2, 2004.

(51) Int. Cl.
*H04Q 7/00* (2006.01)
(52) U.S. Cl. .................. 370/334; 370/330; 370/328
(58) Field of Classification Search ........... 370/334, 370/337, 330, 329, 442, 328, 527
See application file for complete search history.

(56) References Cited

U.S. PATENT DOCUMENTS

| 6,085,178 | A  | * | 7/2000  | Bigus et al. ............... 705/80 |
| 6,618,452 | B1 |   | 9/2003  | Huber et al. |
| 6,760,599 | B1 | * | 7/2004  | Uhlik ..................... 455/525 |
| 6,795,413 | B1 | * | 9/2004  | Uhlik ..................... 370/330 |
| 7,158,493 | B1 | * | 1/2007  | Uhlik et al. .............. 370/329 |
| 2002/0065047 | A1 |   | 5/2002  | Moose |
| 2003/0133426 | A1 | * | 7/2003  | Schein et al. ............ 370/337 |
| 2003/0156594 | A1 | * | 8/2003  | Trott et al. ............... 370/442 |
| 2003/0181183 | A1 |   | 9/2003  | Ventura |
| 2004/0131012 | A1 |   | 7/2004  | Mody et al. |
| 2004/0246998 | A1 | * | 12/2004 | Ma et al. ................. 370/527 |
| 2006/0029017 | A1 | * | 2/2006  | Mudulodu et al. ....... 370/328 |

* cited by examiner

*Primary Examiner*—CongVan Tran

(57) ABSTRACT

A method and system for transmitting training information in a block transmission system is provided. The method includes transmitting a first information bearing unit by at least one transmit antenna. The method further includes transmitting a second information bearing unit by the at least one transmit antenna. The second information bearing unit is the first information bearing unit shifted by a frequency offset. As a result, the combination of the first information bearing unit and the second information bearing unit is substantially periodic. Further, the combination of the first information bearing unit and the second information bearing unit is one of preamble, midamble, or postamble.

25 Claims, 5 Drawing Sheets

TRAINING INFORMATION TRANSMISSION METHOD IN A BLOCK TRANSMISSION SYSTEM

RELATED APPLICATION DATA

This application claims the priority date of U.S. Provisional Application Ser. No. 60/598,311 filed Aug. 2, 2004 entitled "PREAMBLE STRUCTURE FOR MOBILE AND FIXED CELLULAR SYSTEMS".

BACKGROUND OF THE INVENTION

The invention generally relates to block transmission systems. More specifically, the invention relates to a method and system for transmitting training information in a block transmission system.

In some known multiple transmit antenna systems such as 802.16e and 802.16d wireless Metropolitan Area Networks (MAN), a preamble is transmitted from a single transmit antenna and training information is provided separately for remaining transmit antennas. This may result in non-uniform training for the transmit antennas.

In some known block transmission systems, the preamble includes a cell identifier based on which the receiver identifies a base station. A cell identifier generally refers to a sequence based on which a receiver identifies a base station. Periodicity or strong correlation properties in the time domain, helps in synchronizing a receiver in a block transmission system which has a significant number of cell identifiers.

There is therefore, a need for a method and system in which training information with substantial periodicity and good pilot density is transmitted to simultaneously train all existing transmit antennas.

SUMMARY

An objective of the invention is to provide a method and system in which substantially periodic training information with good pilot density is transmitted so as to enable simple synchronization and robust channel estimation.

Another objective of the invention is to provide a method and system in which all transmit antennas are trained simultaneously.

In order to fulfill the above-mentioned objectives, a method for transmitting training information in a block transmission system is provided. The method includes transmitting a first information bearing unit by at least one transmit antenna. The method further includes transmitting a second information bearing unit by the at least one transmit antenna. The second information bearing unit is the first information bearing unit shifted by a frequency offset. The combination of the first information bearing unit and the second information bearing unit is substantially periodic and provides good pilot density. Further, the combination of the first information bearing unit and the second information bearing unit is one of preamble, midamble, or postamble.

BRIEF DESCRIPTION OF DRAWINGS

A more complete appreciation of the present invention and the attended advantages will become readily apparent as the same becomes better understood by reference of the following detailed description when considered in conjunction with the accompanying drawings in which reference symbols indicate the same or similar components, wherein.

DETAILED DESCRIPTION OF DRAWINGS

The invention provides a method and system for transmitting training information in a block transmission system. Examples of block transmission include Orthogonal Frequency Division Multiplexing (OFDM), Multi-Carrier Code Division Multiple Access (MC-CDMA), Discrete Multi-Tone (DMT) and the like. The IEEE 802.16d and 802.16e wireless Metropolitan Area Network (MAN) standards, which use OFDM-like technology, also fall in this category. In various embodiments of the invention, the block transmission system is a frequency reuse system. In an exemplary embodiment of the invention, the block transmission system is a frequency reuse-1 system.

As is the case in most block transmission systems, guard sub-carriers may be present on the left and right of the set of sub-carriers on which transmission occurs. The set of sub-carriers that exclude the guard sub-carriers are henceforth collectively referred to as the transmission sub-carrier set.

Figure 1:
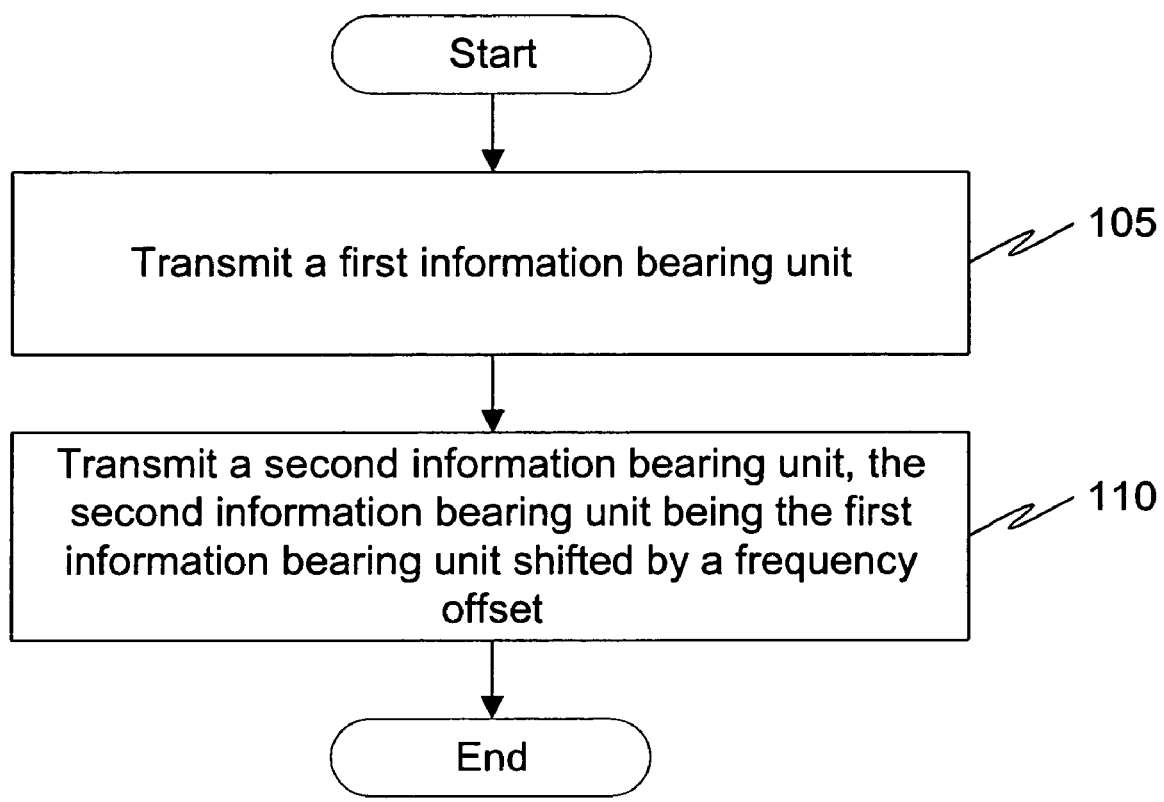
FIG. 1 is a flowchart is a method for transmitting training information in a block transmission system, in accordance with an embodiment of the invention.

FIG. 1 is a flowchart of a method of transmitting training information in a block transmission system, in accordance with an embodiment of the invention. At step 105, a first information bearing unit is transmitted by at least one transmit antenna.

At step 110, a second information bearing unit is transmitted by the at least one transmit antenna. The second information bearing unit is the first information bearing unit shifted by a frequency offset. As a result, the combination of the first information bearing unit and the second information bearing unit is substantially periodic. In an embodiment of the invention, the second information bearing unit is shifted from the first information bearing unit by an integer frequency offset. In an exemplary embodiment of the invention, the integer frequency offset is equal to three frequency sub-carriers if the number of transmit antennas is at most two and if the number of sectors in a cell is equal to three. In another exemplary embodiment of the invention, the integer frequency offset is equal to six sub-carriers if the number of transmit antennas is three or four and if the number of sectors in a cell is equal to three. In an embodiment of the invention, the second information bearing unit is shifted from the first information bearing unit by an integer frequency offset and a fractional frequency offset. In another embodiment of the invention, the second information bearing unit may be shifted from the first information bearing unit by a fractional frequency offset. The presence of a fractional frequency offset may be used to provide channel response at non-integer sub-carrier spacing.

In an embodiment of the invention, the combination of the first information bearing unit and the second information bearing unit is a preamble. In another embodiment of the invention, the combination of the first information bearing unit and the second information bearing unit may be a midamble. In yet another embodiment of the invention, the combination of the first information bearing unit and the second information bearing unit may be a postamble.

In an embodiment of the invention, the first information bearing unit includes a cell identifier and a predetermined identifier. A cell identifier is generally referred to as a sequence based on which a receiver identifies a base station. In an exemplary embodiment of the invention, the cell identifier is a binary sequence of −1s and +1s and has a predefined length. For example, in 802.16e and 802.16d standards, the cell identifier of a base station is selected from a set of 114 binary sequences. The predetermined identifier is another sequence like the cell identifier.

In various embodiments of the invention, the sequences transmitted on the sub-carriers can be chosen to ensure low PAPR (peak to average power ratio) of transmission from the corresponding transmit antenna.

In an embodiment of the invention, the first information bearing unit is transmitted on a first symbol and the second information bearing unit is transmitted on a second symbol. In an embodiment of the invention, the first information bearing unit (and the second information bearing unit) is transmitted on more than one symbol. This may be done to maintain good pilot density. For example, if the number of transmit antennas is eight, the first information bearing unit may be transmitted on two symbols. In this example, the first four transmit antennas transmit on a first symbol and the remaining transmit antennas transmit on a second symbol.

In various embodiments of the invention, the pilot density of transmission from the antenna increases due the frequency offset. Further, all transmit antennas are trained simultaneously.

Figure 2:
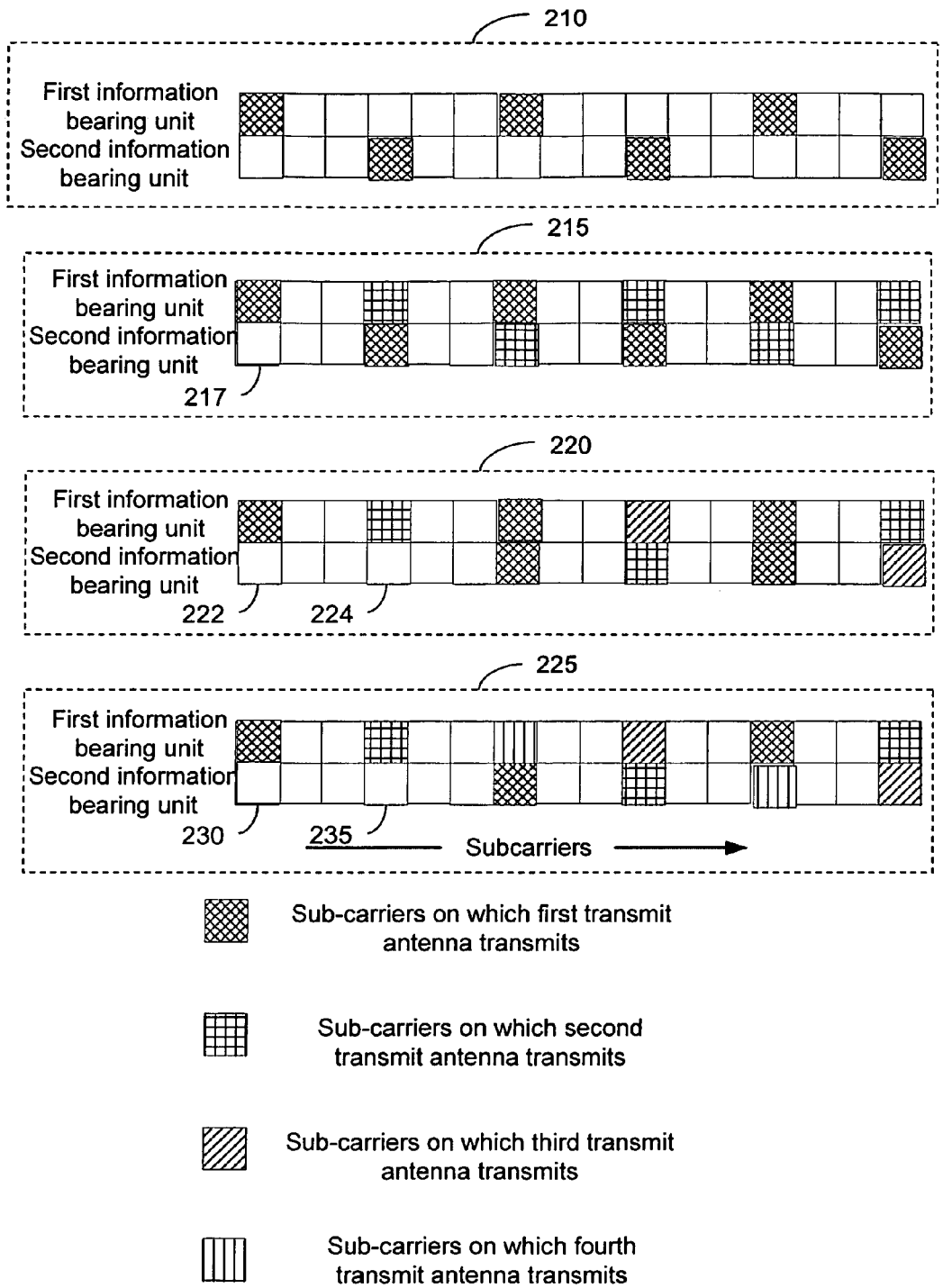
FIG. 2 shows the transmit antenna to sub-carrier mapping in a particular sector for various combinations of a first information bearing unit and a second information bearing unit, in accordance with an exemplary embodiment of the invention.

FIG. 2 shows the transmit antenna to sub-carrier mapping in a particular sector for various combinations of the first information bearing unit and the second information bearing unit, in accordance with an exemplary embodiment of the invention. In this exemplary embodiment of the invention, the number of sectors in a cell is equal to three. FIG. 2 shows only the first few sub-carriers of the transmission sub-carrier set.

In various embodiments of the invention, the sub-carriers of the symbols carrying the training information that are allocated to a second sector are shifted by one with respect to those allocated to a first sector. For example, if the number of sectors in a cell is equal to three, the sub-carriers of the symbols carrying the training information that are allocated to sector two are shifted by one sub-carrier with respect to those of sector one, and the sub-carriers of sector three are shifted by one sub-carrier with respect to those of the sector two.

If the number of transmit antennas in a particular sector is equal to one, the predetermined identifier and cell identifier are transmitted simultaneously by a first transmit antenna. In an embodiment of the invention, the second information bearing unit is transmitted at an integer frequency offset (from the first information bearing unit) of three sub-carriers. The transmit antenna to sub-carrier mapping for this combination of the first information bearing unit and the second information bearing unit is shown at 210.

If the number of transmit antennas in a particular sector is equal to two, the predetermined identifier is transmitted by a first transmit antenna and the cell identifier is transmitted by a second transmit antenna. The second information bearing unit is transmitted at an integer frequency offset (from the first information bearing unit) of three sub-carriers. The transmit antenna to sub-carrier mapping for this combination of the first information bearing unit and the second information bearing unit is shown at 215. The first information bearing unit is transmitted on a first symbol and the second information bearing unit is transmitted on a second symbol. In an embodiment of the invention, no transmission occurs on an unused-sub-carrier 217 (allocated to the particular sector) in the second symbol. Also, no transmission occurs in the first symbol on the last sub-carrier on which transmission occurs in the second information bearing unit. In another embodiment of the invention, in addition to the transmission of the first information bearing unit and the second information bearing unit, transmission also occurs on the unused-sub-carrier 217 in the second symbol. In this embodiment of the invention, the second transmit antenna transmits a pilot on this sub-carrier. Further, in the first symbol, the first transmit antenna also transmits a pilot on the last sub-carrier on which transmission occurs in the second information bearing unit. This ensures that various transmit antennas have pilots (for channel estimation purposes) on either ends of the transmission sub-carrier set.

If the number of transmit antennas in a particular sector is equal to three or four, the predetermined identifier is transmitted by a first transmit antenna and the cell identifier is transmitted by a remaining transmit antenna. In an embodiment of the invention, the cell identifier is transmitted by a second transmit antenna, if the number of transmit antennas in a particular sector is equal to three. In an embodiment of the invention, the first information bearing unit further includes at least one training sequence. The at least one training sequence trains at least one transmit antenna. For example, the cell identifier may be transmitted by a second transmit antenna and a first training sequence may be transmitted by a third transmit antenna, if the number of transmit antennas in a particular sector is equal to three. The second information bearing unit is transmitted at an integer frequency offset (from the first information bearing unit) of six sub-carriers. The transmit antenna to sub-carrier mapping for this combination of the first information bearing unit and the second information bearing unit for the case when the number of transmit antennas in a particular sector is equal to three, is shown at 220. The transmit antenna to sub-carrier mapping for this combination of the first information bearing unit and the second information bearing unit for the case when the number of transmit antennas in a particular sector is equal to four, is shown at 225. In an embodiment of the invention, the first two sub-carriers on which transmission occurs in the first symbol (for example, a unused-sub-carrier 222 and a unused-sub-carrier 224 if the number of transmit antennas is equal to three and similarly, a unused-sub-carrier 230 and a unused-sub-carrier 235 if the number of transmit antennas is equal to four) are also transmitted in the second symbol. Also, the last two sub-carriers on which the transmission occurs in the second symbol are also transmitted in the first symbol.

In various embodiments of the invention, if a particular transmit antenna transmits at least one of a cell identifier or predetermined identifier in a symbol, and the number of sub-carriers on which transmission occurs from the transmit antenna in the symbol is greater than the length of at least one of the cell identifier or predetermined identifier, pilots are transmitted on the remaining sub-carriers for channel estimation purposes. The set of sub-carriers on which the cell identifier and the predetermined identifier is transmitted is fixed and known to the receiver.

In an exemplary embodiment of the invention, the number of transmit antennas is determined at a receiver based on a method is disclosed in U.S. Provisional Application Ser. No. 60/591,318 filed Jul. 26, 2004 entitled "PREAMBLE STRUCTURES FOR MOBILE AND FIXED CELLULAR SYSTEMS".

Figure 3:
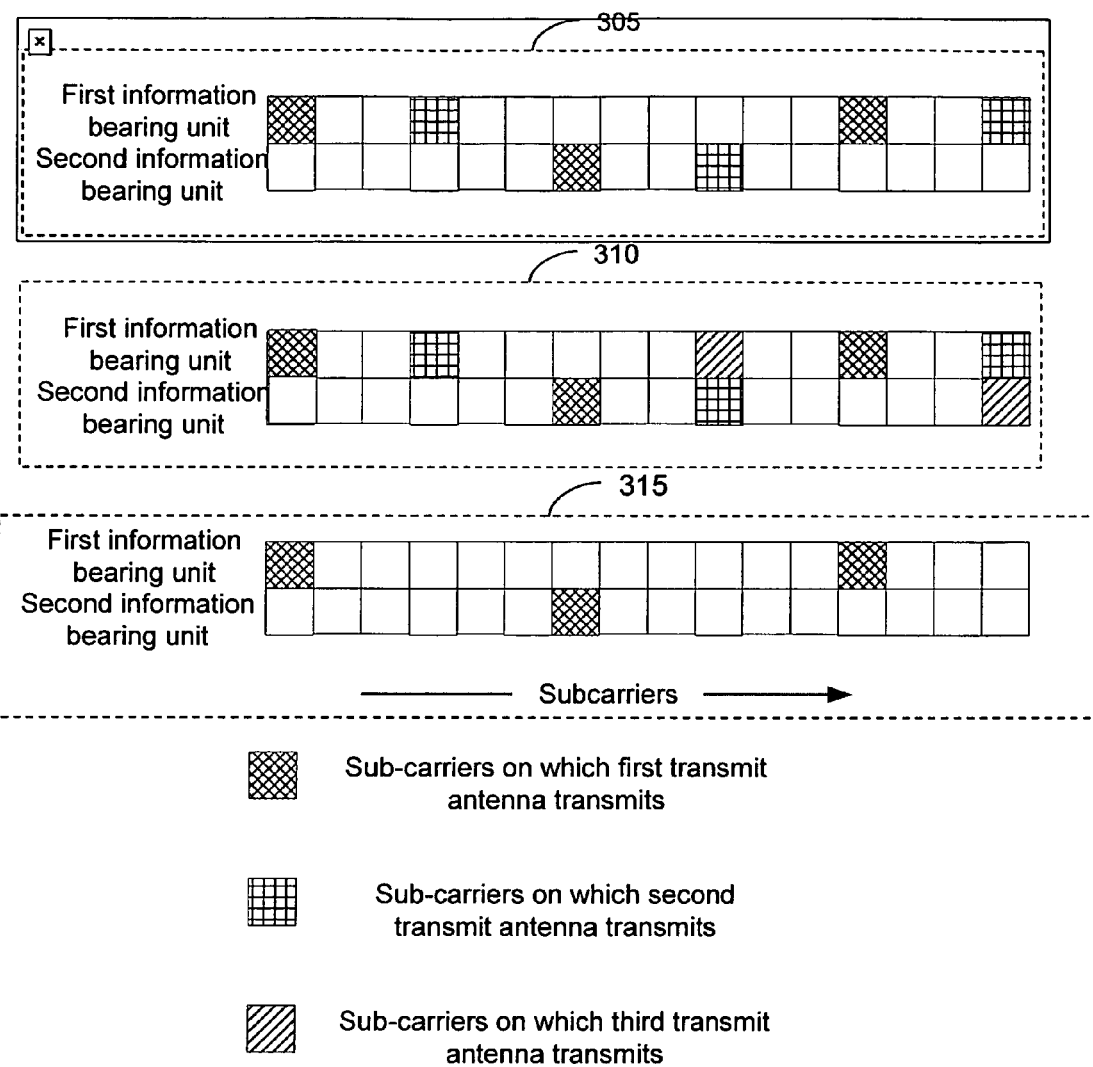
FIG. 3 shows the transmit antenna to sub-carrier mapping in a particular sector for various combinations of a first information bearing unit and a second information bearing unit, in accordance with another exemplary embodiment of the invention.

FIG. 3 shows the transmit antenna to sub-carrier mapping in a particular sector for various combinations of a first information bearing unit and a second information bearing unit, in accordance with another exemplary embodiment of the invention. The sub-carriers on which the cell identifier and the sub-carriers on which the predetermined identifier is decided based on the maximum number of transmit antennas per sector of the block transmission system. In an embodiment of the invention, a combination of the first information bearing unit and the second information bearing unit transmitted in a particular sector is substantially similar to a combination of the first information bearing unit and the second information bearing unit transmitted in a sector that has a predefined number of transmit antennas, if the number of transmit antennas in the particular sector is less than the predefined number of transmit antennas. The predefined number of transmit antennas is equal to the maximum number of transmit antennas per sector of the block transmission system. If the number of transmit antennas in a particular sector is at least two and is less than the predefined number of transmit antennas, a similar combination of the first information bearing unit and the second information bearing unit is used, as for maximum number of transmit antennas case. In an embodiment of the invention, no transmission occurs on the sub-carriers on the antennas that are non-existent For example, for the case when the number of sectors in a cell is equal to three, and the predefined number of transmit antennas is equal to four, the transmit antenna to sub-carrier mapping for the combination of the first information bearing unit and the second information bearing unit for the case when a particular sector has two transmit antennas is shown at 305 (the case when the sector has the predefined number of transmit antennas (equal to four) is shown at 225). Also, the case when a particular sector has three transmit antennas is shown at 310. If the number of transmit antennas is equal to one, both the predetermined identifier and the cell identifier is transmitted by the first transmit antenna. The sub-carriers on which the first transmit antenna transmits is shown at 315. In other embodiments of the invention, the sub-carriers in the transmit sub-carrier set allotted to a particular sector, which are otherwise not transmitted, may be transmitted with pilots to improve the pilot density for channel estimation purposes.

In various embodiments of the invention, a receiver in a sector that is capable of decoding the transmission from a number of transmit antennas lesser than the available number of transmit antennas in the sector, can still synchronize and obtain channel estimates, and thereby talk to the base station.

Figure 4:
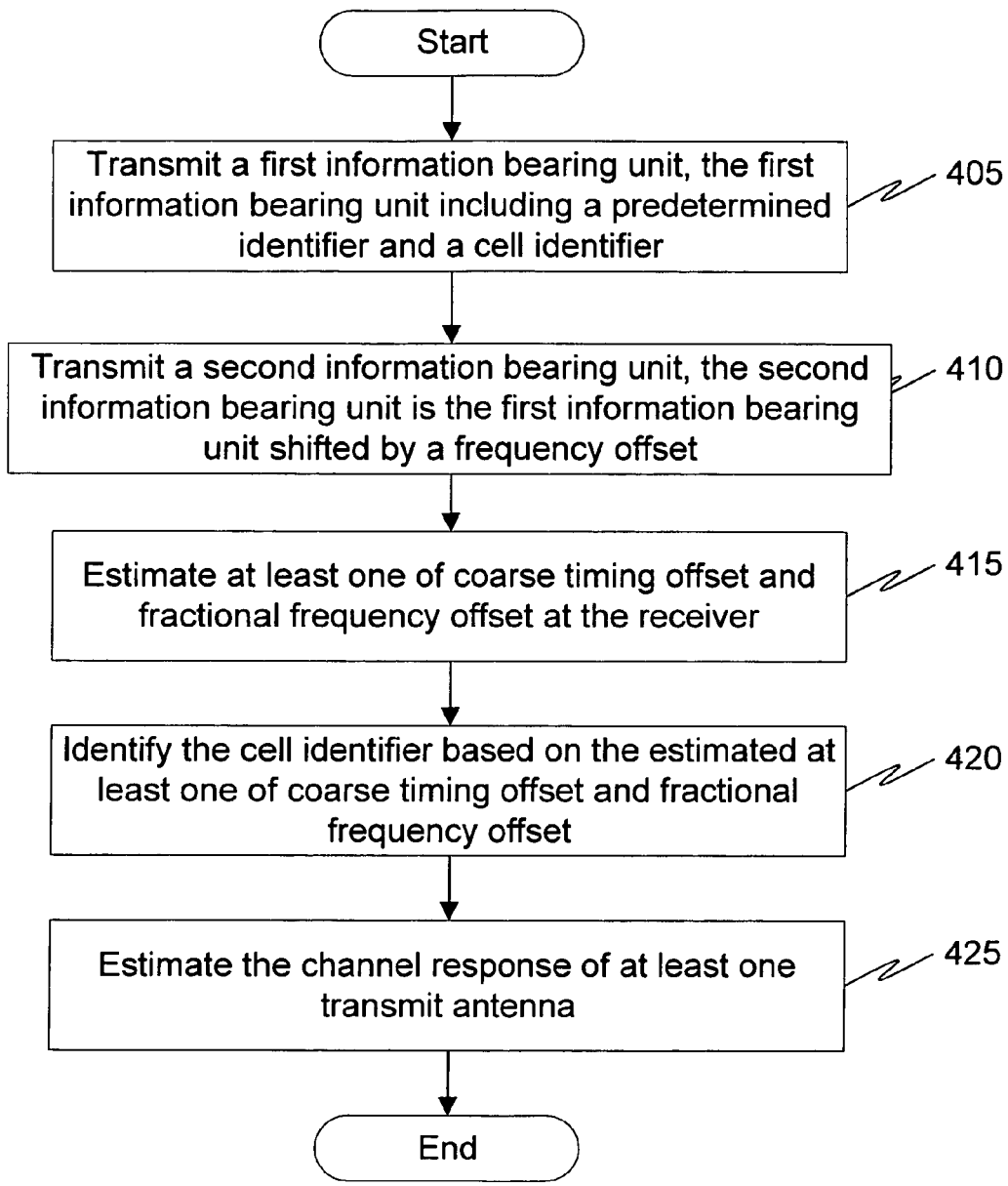
FIG. 4 is a flowchart of a method of enabling channel estimation and synchronization of a receiver in a block transmission system, in accordance with an embodiment of the invention.

FIG. 4 is a flowchart of a method of enabling channel estimation and synchronization of a receiver in a block transmission system, in accordance with an embodiment of the invention. At step 405, a first information bearing unit is transmitted by at least one transmit antenna. At step 410, a second information bearing unit is transmitted by at least one transmit antenna. The second information bearing unit is the first information bearing unit shifted by a frequency offset. As a result, the combination of the first information bearing unit and the second information bearing unit is substantially periodic. In an embodiment of the invention, the second information bearing unit is shifted from the first information bearing unit by an integer frequency offset.

At step 415, at least one of coarse timing offset estimate and fractional frequency offset estimate is obtained by using the periodicity of the combination of the first information bearing unit and the second information bearing unit. This may further help in estimating an integer component of the frequency offset (between the transmit and receive carrier frequencies) and in obtaining a fine timing offset estimate.

At step 420, the cell identifier is identified based on the obtained at least one of the coarse timing offset estimate and the fractional frequency offset estimate. In an embodiment of the invention, the fine timing offset estimate and the integer component of the frequency offset estimate (between the transmit and the receive carrier frequencies) is obtained along with the cell identifier. At step 425, the channel response of at least one transmit antenna is estimated based on the pilots which a corresponding transmit antenna transmits in the first information bearing unit and the second information bearing unit.

Figure 5:
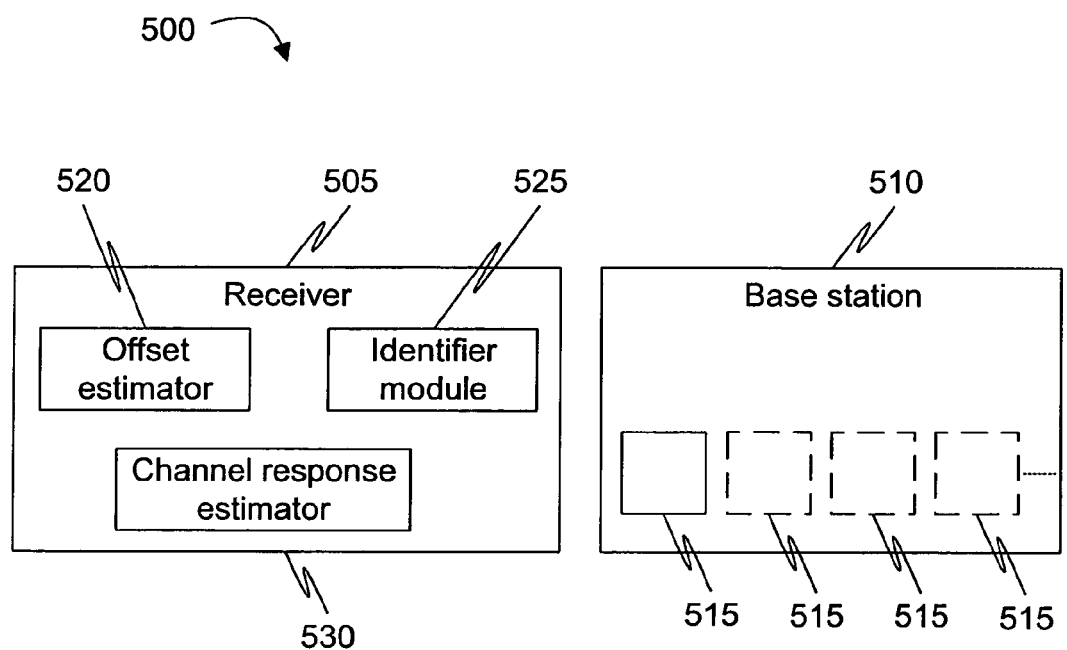
FIG. 5 is a block diagram of a system for enabling channel estimation and synchronization of a receiver in a block transmission system, in accordance with an embodiment of the invention.

FIG. 5 shows a system 500 that enables channel estimation and synchronization of a receiver 505 in a block transmission system, in accordance with an embodiment of the invention. The block transmission system includes a plurality of base stations 510. In various embodiments of the invention, the block transmission system is a frequency reuse system. In an exemplary embodiment of the invention, the block transmission system is a frequency reuse-1 system.

Each base station includes at least one transmit antenna 515. System 500 includes an offset estimator 520, an identifier module 525 and a channel response estimator 530. In various embodiments of the invention, offset estimator 520, identifier module 525 and channel response estimator 530 reside on receiver 505.

At least one transmit antenna 515 transmits a first information bearing unit and a second information bearing unit. The first information bearing unit includes a cell identifier. In an embodiment of the invention, the first information bearing unit further includes a predetermined identifier. The second information bearing unit is the first information bearing unit shifted by a frequency offset. As a result, the combination of the first information bearing unit and the second information bearing unit is substantially periodic. In an embodiment of the invention, the second information bearing unit is shifted from the first information bearing unit by an integer frequency offset. In an exemplary embodiment of the invention, the integer frequency offset is equal to three frequency sub-carriers if the number of transmit antennas is at most two and if the number of sectors in a cell is equal to three. In another exemplary embodiment of the invention, the integer frequency offset is equal to six sub-carriers if the number of transmit antennas is three or four and if the number of sectors in a cell is equal to three.

In an embodiment of the invention, offset estimator 520 obtains at least one of coarse timing offset estimate and fractional frequency offset estimate at receiver 505 by using the periodicity of the combination of the first information bearing unit and the second information bearing unit. Offset estimator 520 may also correct for these offsets. Further, identifier module 525 identifies the cell identifier based on the estimated at least one of coarse timing offset estimate and fractional frequency offset estimate. In an embodiment of the invention, offset estimator 520 obtains the fine timing offset estimate and the integer component of the frequency offset estimate (between the transmit and the receive carrier frequencies) along with identifier module 525. The periodicity helps in simplifying the process of synchronization.

Channel response estimator 530 estimates channel response of at least one transmit antenna based on the pilots which a corresponding transmit antenna transmits in the first information bearing unit and the second information bearing unit.

In an embodiment of the invention, offset estimator 520, identifier module 525 and channel response estimator 530 can be integrated into a single module. In an embodiment of the invention, these modules may interact with one another.

The various embodiments of the invention provide a method and system in which substantially periodic training information with good pilot density is transmitted. The pilots are free from interference from neighboring sectors and also from other transmit antennas in the same sector. Further, the various embodiments of the invention provide a method and system in which all transmit antennas are trained simultaneously.

The various embodiments of the invention provide a method and system in which a receiver in a sector that is capable of decoding the transmission from a number of transmit antennas lesser than the available number of transmit antennas in the sector, can still synchronize and obtain channel estimates, and thereby talk to the base station. This further enables a base station to support receivers with different capabilities.

What is claimed:

1. A method for transmitting training information in a block transmission system, the block transmission system being a frequency reuse system, the method comprising the steps of;
    a. transmitting a first information bearing unit, the first information bearing unit being transmitted by at least one transmit antenna; and
    b. transmitting a second information bearing unit, the second information bearing unit being transmitted by the at least one transmit antenna, the second information bearing unit being the first information bearing unit shifted by a frequency offset, wherein the combination of the first information bearing unit and the second information bearing unit is substantially periodic, the combination of the first information bearing unit and the second information bearing unit being one of preamble, midamble, or postamble;
        whereby, the frequency offset increases the pilot density of transmission from a transmit antenna.

2. The method of claim 1, whereby each transmit antenna is trained simultaneously.

3. The method of claim 1, wherein the first information bearing unit comprises a predetermined identifier and a cell identifier.

4. The method of claim 1, wherein the frequency offset is an integer frequency offset.

5. The method of claim 4, wherein the integer frequency offset is equal to three sub-carriers if the number of transmit antennas is at most two and if the number of sectors in a cell is equal to three, wherein the number of transmit antennas is determined at a receiver based on a predetermined identifier.

6. The method of claim 3, wherein the predetermined identifier and the cell identifier are transmitted simultaneously by a first transmit antenna, if the number of transmit antennas is equal to one.

7. The method of claim 3, wherein the predetermined identifier is transmitted by a first transmit antenna and the cell identifier is transmitted by a second transmit antenna, if the number of transmit antennas is equal to two.

8. The method of claim 4, wherein the integer frequency offset is equal to six sub-carriers if the number of transmit antennas is three or four and if the number of sectors in a cell is equal to three, wherein the number of transmit antennas is determined at a receiver based on a predetermined identifier.

9. The method of claim 3, wherein the predetermined identifier is transmitted by a first transmit antenna and the cell identifier is transmitted by a second transmit antenna, if the number of transmit antennas is equal to two.

10. The method of claim 8, wherein the first information bearing unit further comprises at least one training sequence, the at least one training sequence training at least one transmit antenna.

11. The method of claim 10, wherein a predetermined identifier is transmitted by a first transmit antenna, a cell identifier is transmitted by a second transmit antenna, and the training sequence is transmitted by a third transmit antenna if the number of transmit antennas is equal to three.

12. The method of claim 1, wherein a pilot is transmitted on at least one unused-sub-carrier, wherein an unused-sub-carrier is a sub-carrier allocated to a sector and no transmission occurs on the unused-sub-carrier.

13. The method of claim 1, wherein a combination of the first information bearing unit and the second information bearing unit transmitted in a particular sector is substantially similar to a combination of the first information bearing unit and the second information bearing unit transmitted in a sector that has a predefined number of transmit antennas, wherein the number of transmit antennas in the particular sector is less than the predefined number of transmit antennas, wherein the predefined number of transmit antennas is equal to maximum number of transmit antennas per sector of the block transmission system.

14. A method for enabling channel estimation and synchronization of a receiver in a block transmission system, the block transmission system being a frequency reuse system, the method comprising the steps of;
    a. transmitting a first information bearing unit, the first information bearing unit being transmitted by at least one transmit antenna, the first information bearing unit comprising a predetermined identifier and a cell identifier;
    b. transmitting a second information bearing unit, the second information bearing unit being transmitted by the at least one transmit antenna, the second information bearing unit being the first information bearing unit shifted by a frequency offset, wherein the combination of the first information bearing unit and the second information bearing unit is substantially periodic;
    c. obtaining at least one of coarse timing offset estimate and fractional frequency offset estimate by using the periodicity of the combination of the first information bearing unit and the second information bearing unit;
    d. identifying the cell identifier based on the obtained at least one of coarse timing offset estimate and fractional frequency offset estimate; and
    e. estimating channel response of at least one transmit antenna;
        whereby, the frequency offset between the first information bearing unit and the second information bearing unit helps improve the channel estimation.

15. The method of claim 14, wherein the frequency offset is equal to three sub-carriers if the number of transmit antennas is at most two and if the number of sectors in a cell is equal to three, wherein the number of transmit antennas is determined at the receiver based on the predetermined identifier.

16. The method of claim 15, wherein the predetermined identifier and the cell identifier are transmitted simultaneously by a first transmit antenna, if the number of transmit antennas is equal to one.

17. The method of claim 15, wherein the predetermined identifier is transmitted by a first transmit antenna and the cell identifier is transmitted by a second transmit antenna, if the number of transmit antennas is equal to two.

18. The method of claim 14, wherein the frequency offset is equal to six sub-carriers if the number of transmit antennas is three or four and if the number of sectors in a cell is equal to three, wherein the number of transmit antennas is determined at the receiver based on the predetermined identifier.

19. The method of claim 18, wherein the predetermined identifier is transmitted by a first transmit antenna and the cell identifier is transmitted by a remaining transmit antenna.

20. A system for enabling channel estimation and synchronization of a receiver in a block transmission system, the block transmission system being a frequency reuse system, the system comprising;
   a. at least one transmit antenna, the transmit antenna transmitting a first information bearing unit and a second information bearing unit, the first information bearing unit comprising a cell identifier, the second information bearing unit being the first information bearing unit shifted by a frequency offset, wherein the combination of the first information bearing unit and the second information bearing unit is substantially periodic;
   b. an offset estimator, the offset estimator obtaining at least one of coarse timing offset estimate and fractional frequency offset estimate by using the periodicity of the combination of the first information bearing unit and the second information bearing unit, the offset estimator residing on the receiver;
   c. an identifier module, the identifier module identifying the cell identifier based on the at least one obtained coarse timing offset estimate and fractional frequency offset estimate, the cell identifier residing on the receiver; and
   d. a channel response estimator, the channel response estimator estimating channel response of at least one transmit antenna;
   whereby, the presence of frequency offset helps improve the channel estimation.

21. The system of claim 20, wherein the block transmission system is frequency reuse-1 system.

22. The system of claim 20, wherein the frequency offset is equal to three sub-carriers if the number of transmit antennas is at most two and the number of sectors in a cell is equal to three.

23. The system of claim 20, wherein the frequency offset is equal to six sub-carriers if the number of transmit antennas is three or four and the number of sectors in a cell is equal to three.

24. The system of claim 20, whereby each transmit antenna is trained simultaneously.

25. The system of claim 20, wherein the first information bearing unit further comprises a predetermined identifier.

* * * * *